United States Patent [19]

Leoncavallo et al.

[11] Patent Number: 4,861,466
[45] Date of Patent: Aug. 29, 1989

[54] PRESSURE FILTER ASSEMBLY WITH BLEED VALVE

[75] Inventors: Richard A. Leoncavallo, Pittsford; Gregory R. Phillips, Penfield; Ravinder C. Mehra, Fairport, all of N.Y.

[73] Assignee: Nalge Company, Rochester, N.Y.

[21] Appl. No.: 181,416

[22] Filed: Apr. 14, 1988

[51] Int. Cl.[4] .................. B01D 27/10; B01D 35/14
[52] U.S. Cl. ............................... 210/120; 210/136; 210/137; 210/436; 210/472; 55/213; 55/310; 55/417; 55/385.4; 251/214; 251/288; 251/324
[58] Field of Search .............. 210/136, 137, 418, 436, 210/472, 120, 180; 251/214, 288, 324; 55/213, 270, 310, 312, 313, 385 C, 417, 420, DIG. 32

[56] References Cited

U.S. PATENT DOCUMENTS

| | | | |
|---|---|---|---|
| 1,467,486 | 9/1923 | Livingston | 251/264 |
| 1,535,406 | 4/1925 | Eynon | 251/264 |
| 1,546,149 | 7/1925 | Smith | 251/264 |
| 1,901,971 | 3/1933 | Iorio | 401/89 |
| 1,918,959 | 7/1933 | Culp | 138/43 |
| 2,983,477 | 5/1961 | Merrill | 251/146 |
| 3,255,775 | 6/1966 | Albro et al. | 137/553 |
| 3,484,084 | 12/1969 | Simpson et al. | 261/41 |
| 3,643,917 | 2/1972 | Griffiths et al. | 251/215 |
| 3,747,894 | 7/1973 | Pepper | 251/214 |
| 3,912,630 | 10/1975 | Reighard et al. | 210/136 |
| 4,183,500 | 1/1980 | Nightingale | 251/324 |
| 4,276,163 | 6/1981 | Gordon | 210/136 |
| 4,285,498 | 8/1981 | Nightingale | 251/214 |
| 4,382,579 | 5/1983 | Morris | 251/214 |
| 4,501,663 | 2/1985 | Merrill | 210/347 |
| 4,601,824 | 7/1986 | Dreyer | 210/232 |
| 4,677,774 | 7/1987 | Macchi | 251/214 |
| 4,683,055 | 7/1987 | Bosch et al. | 210/136 |

Primary Examiner—Richard V. Fisher
Assistant Examiner—Wanda L. Millard
Attorney, Agent, or Firm—Marjama & Pincelli

[57] ABSTRACT

A pressure filter assembly having a bleed valve assembly for releasing trapped gas from with the filter chamber in a controlled manner. The bleed valve assembly includes a stem secured to the filter assembly having a bore therethrough for communication with the filter chamber and a cap for controlling the release of trapped gas within the filter chamber. The cap has a plunger with a contact surface which mates with a portion of the inside surface of the stem bore and an extension which fits with a narrow portion of the bore.

8 Claims, 2 Drawing Sheets

PRESSURE FILTER ASSEMBLY WITH BLEED VALVE

BACKGROUND OF THE INVENTION

The present invention relates to a filter assembly for filtering substances from a pure or colloidal solution under pressure.

A problem associated with filtering a solution under pressure is that if trapped air or gas is present in the filtering chamber, this can substantially reduce or lock the flow through the filter unit. In some instances, the prior art has attempted to provide features which can remove trapped air from the filtering chamber. These methods have usually been limited to simply allowing air to escape in an uncontrolled manner. However, since the solution to be filtered is under pressure, this can result in having the solution to be filtered squirt out of the chamber causing a mess, potential contamination of the surrounding area and possibly affect the results of the filtering process being conducted.

Applicants have invented an improved filter assembly whereby means are provided for efficiently removing trapped gas in a controlled manner from within the filtering chamber.

SUMMARY OF THE INVENTION

A pressure filter assembly having a bleed valve assembly for releasing trapped gas from within the filter chamber in a controlled manner. The bleed valve assembly includes a stem secured to the filter assembly having a bore therethrough for communication with the filter chamber and a cap for controlling the release of trapped gas within the filter chamber. The cap has a plunger with a contact surface which mates with a portion of the inside surface of the stem bore and an extension which fits with a narrow portion of the bore.

DETAILED DESCRIPTION OF THE INVENTION

Figure 1:
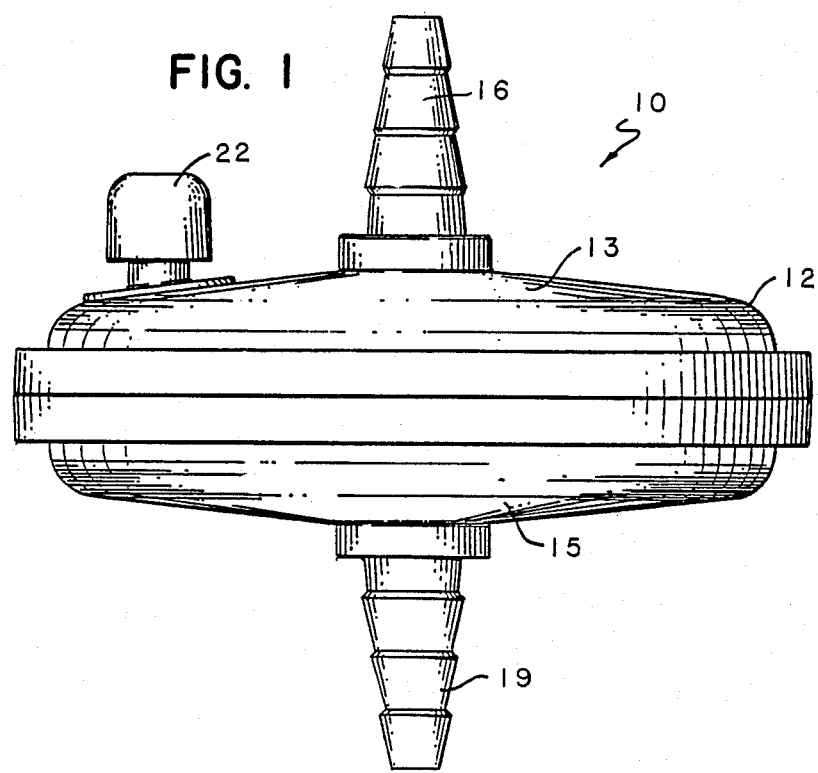
FIG. 1 is a top plan view of a closed filter assembly made in accordance with the present invention.
Figure 2:
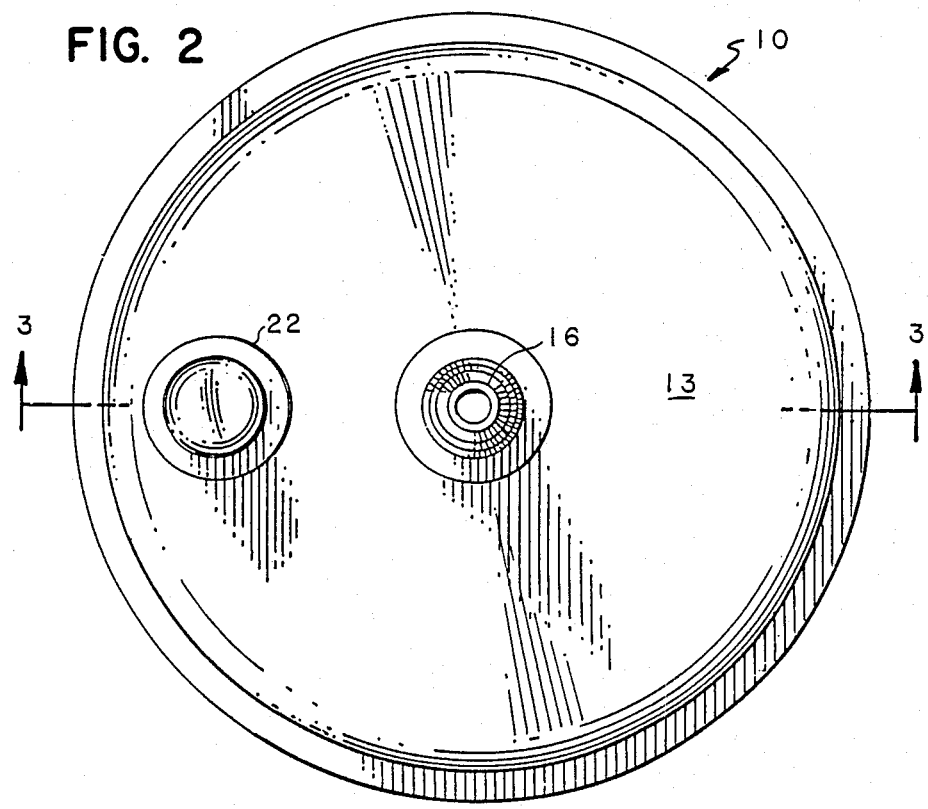
FIG. 2 is a front elevational view of the filter assembly of FIG. 1.
Figure 3:
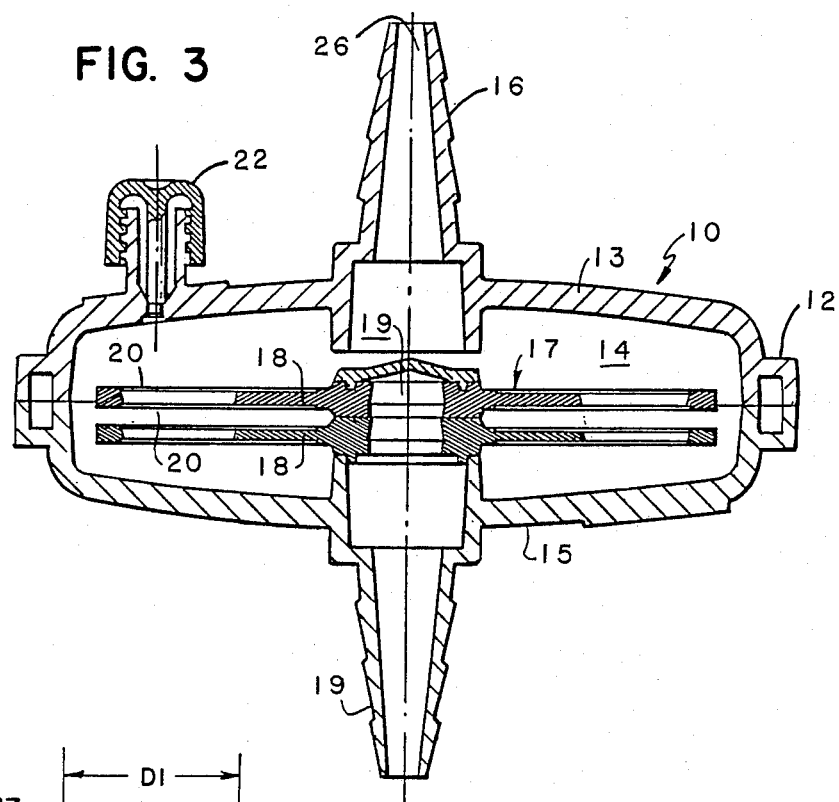
FIG. 3 illustrates a cross sectional view of the filter assembly of FIG. 2 taken along line 3—3.

Referring to FIGS. 1-4, there is illustrated a filter assembly 10 made in accordance with the present invention which is preferably designed to be disposed after a single use. Typically, the filter assembly 10 is designed to filter liquids under pressure up to about 65 psi, generally in the range of 10 psi to 25 psi and is designed to be disposed of after a single use. The filter assembly 10 comprises a plastic housing 12 formed by a molded plastic upper portion 13 and a molded plastic lower portion 15 which are sealed together by ultrasonic welding to form a filtering chamber 14. Typically, such filter units are disposable filter units designed for single use. The upper and lower portions 13, 15 may be made of any desired plastic material. In the particular embodiment illustrated, portions 13, 15 are made of a polycarbonate. The housing 12 has an inlet port 16 integrally formed therein having a passage 26 which communicates with the filter chamber 14. The housing 12 further comprises an outlet port 16 for removing the liquid after it has been filtered. Filter means 17 for filtering a liquid entering the filtering chamber is provided within chamber 14. In the particular embodiment illustrated, the filter means 17 comprises a plurality of support disks 18 each having a flat filtering membrane 20 disposed on each side of the support disk 18 for filtering a liquid. The disks 18 each have a passageway therein for receiving the filtrate that is filtered by membrane 20 which communicate with a common passage 29 which in turn communicates with the outlet port 19. The particular details of construction of filter means 17 filed concurrently and may be found in co-pending U.S. application Ser. No. 181,417. It is to be understood, however, that any desired means may be used for filtering the liquid within the filter chamber 20.

Figure 4:
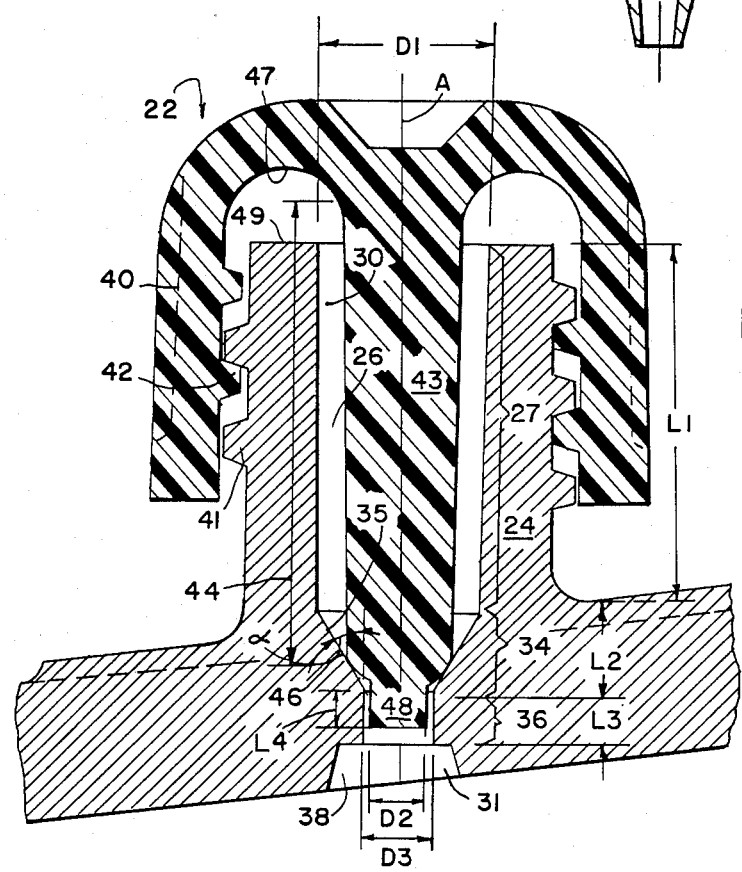
FIG. 4 is an enlarged sectional view of a portion of the filter assembly of FIG. 1 illustrating the means for removing a trapped gas from within the filtering chamber.

A bleed valve assembly 22 is provided in housing 12 for removing trapped gas from within the filtered chamber 14. Referring to FIG. 4, there is illustrated an enlarge cross sectional view of the bleed valve assembly 22 made in accordance with the present invention. Bleed valve assembly 22 comprises a stem 24 which extends outwardly away from the housing 12. Preferably, stem 24 is integrally formed with housing 12. The stem 24 has a passage or bore 26 which extends therethrough. The outer end 30 of bore 26 communicates with the outside environment, such as atmosphere, and the inner end 31 of bore 26 communicates with the filtering chamber 14. The bore 26 has a first longitudinal section 27 of a predetermined length L1 and diameter D1. Preferably, the diameter D1 is substantially constant along length L1. A second transition section 34 is provided adjacent the inner end of the first longitudinal section 27 whereby the diameter of bore 26 substantially reduces along the length L2 of the transition section 34. In the particular embodiment illustrated, mating surface 35 is disposed at an angle α of about 30° with respect to the longitudinal axis A of bore 26. However, mating surface 35 may be disposed at any desired angle α capable of providing a seal. The bore 26 adjacent the inner end of transition section 34 is provided with a narrow substantially cylindrical section 36 having a diameter D2 and a length L3. In the particular embodiment illustrated, there is provided a recess 38 at the inner end of the narrow cylindrical section 36. However, recess 38 may be omitted if so desired.

A plastic bleed cap is provided for engagement with the exterior portion of the stem 24. Preferably cap 40 is made of a more pliable material than stem 24. In the particular embodiment illustrated, the exterior of the stem 24 is provided with threads 41 which mate with corresponding threads 42 in the innter surface of bleed cap 40. As the bleed cap 40 is rotated in one direction, this will cause the cap 40 to move either vertically up or down and when rotated in the opposite direction. The threads 41, 42 are of a pitch and size which allow easy passage of a gas therethrough. Bleed cap 40 is provided with a plunger 43 which extends within the bore 26 for controlling the flow of trapped air from within the chamber 14 to atmosphere. The plunger 43 has a first longitudinal section 44 which terminates in a contact annular tip section 46 which is designed to mate with the mating surface 35 of transition section 34. Longitudinal section 44 has a cross sectional area sufficiently smaller than longitudinal section 27 so as to allow gas to easily flow between it and bore 26. The annular contact tip section 46 preferrably has a curved configuration so as to provide sealing engagement when pressed against the mating surface 35 of transition section 34. The plunger 43 has a length such that upper inside surface 47 of cap 40 does not engage the outer end 49 of stem 24. At the inner end of a contact tip section 46, there is provided a cylindrical extension 48 of length L4 which is designed to extend into the narrow cylindrical section 36. The length L4 of extension 48 is such that during rotation of cap 40, a portion extension 48 will still remain within cylindrical section 36 so as to allow controlled escape of trapped air. In the particular embodiment illustrated, L4 is about 0.075". The cylindrical extension 48 is designed to have a diameter D4 only slightly less than the inside diameter D3 of the narrow cylindrical section 36. In the particular embodiment illustrated, diameter D1 is approximately 0.055" and the diameter D2 is approximately 0.045".

When the bleed cap 40 is tightly secured to stem 24, the contacting mating tip section 46 engages transition section 34 so as to provide an annular seal between transition section 34 and tip section 46 to prevent any air and/or liquid from escaping from within the pressurized chamber 14. However, when it is desired to remove trapped air from within the filter chamber 14, the cap 40 is simply rotated in the appropriate direction so as to cause upward vertical movement of the cap 40 thereby causing the plunger 43 to move out of engagement with the transition section 34. As this occurs, air or trapped gas will be allowed to escape in a controlled manner from between the plug and outer surfaces of the inner surface of the bore 26 upwards past the exterior end of the bore 26 and past threaded section of the cap 40 and stem 24. The pitch of threads 41, 42 are such that vertical movement of the plunger is relatively slow, preferably such that extension 48 will not leave narrow section 36 in less than ¼ rotation of the cap 40, preferably not less than ½ rotation.

Since the extension 48 is close in diameter to the narrow cylindrical section 36, the rate of escape of trapped gas is relatively slow and therefore can be controlled quite easily by rotation of cap 40. Further, since the cap and housing are generally made of a clear or translucent plastic, one can carefully control the rate at which trapped gas escapes and close the bleed cap to prevent or minimize any escape of any liquid from within the chamber 14. Additionally, since the sealing portion of cap 40 and stem 24 are distinct from the extension 48, repeated opening and closing of the cap will not substantially affect the ability to control the rate of escape of trapped gases.

It is to be understood that various changes or modifications may be made without departing from the scope of the present invention, for example but not by way of limitation, the shape and/or configuration of mating surface 35 and contact tip section may be varied as desired so long as a sealing relationship is formed therebetween. The scope of the present invention is defined by the following claims.

What is claimed is:

1. A plastic pressure filter assembly having a housing which forms a filtering chamber, filter means disposed within said filtering chamber for filtering a liquid, said housing having an inlet for allowing a liquid to be filtered to flow within the filtering chamber, an outlet for allowing a filtrate to exit said filtering chamber and a bleed valve assembly for removing trapped air or gas within said filtering chamber, said bleed valve assembly comprising:

a stem secured to said housing, said stem having a bore extending therethrough into said filtering chamber, said bore having a first longitudinal section defining a longitudinal axis which communicates with atmosphere, transition section having a cross sectional diameter which decreases in size along its length and a narrow section which communicates with said filtering chamber, said transition section having an annular mating seaing surface disposed at an acute angle with respect to the longitudinal axis of said bore;

a bleed cap having means for engaging said stem portion, said cap having a central longitudinal plunger which extends into said bore of said stem, said plunger having a first longitudinal section, a contact annular tip section for mating with said annular mating sealing surface and a longitudinal inner end capable of extending into said narrow section of said bore, said cap when tightly secured to said stem causes said contact annular tip section to matingly seal with said annular mating sealing surface of said transition section and when said cap is loosened causes said contact annular tip section to move away from said transition section to allow controlled escape of air trapped within said filtering chamber to atmosphere.

2. A plastic pressure filter assembly according to claim 1 wherein said cross sectional configuration of said inner end of said plunger substantially fills said narrow section of said bore when said cap is tightly engaged with respect to said stem.

3. A plastic pressure filter assembly according to claim 1 wherein said annular mating surface is disposed at an angle of about 30°.

4. A plastic pressure filter assembly according to claim 2 wherein said narrow section has a diameter of about 0.055 inches and said inner end of said plunger has a diameter of about 0.045 inches.

5. A pressure filter assembly having a housing which forms a filtering chamber and filter means disposed within said filtering chamber for filtering a liquid, said housing having an inlet for allowing a liquid to flow within the filtering chamber, an outlet for allowing filtrate to exit said filtering chamber and a bleed valve assembly for removing trapped air or gas within said filtering chamber, said bleed valve assembly comprising:

a stem integrally formed in said housing, said stem having a bore extending therethrough into said filtering chamber, said bore having a first longitudinal section defining a longitudinal axis which communicates with atmosphere, a transition section having a cross section shape which decreased in size down along its length and a narrow section which communicates with said filtering chamber, said transition section having an annular mating sealing surface disposed at an acute angle with respect to the longitudinal axis of said bore;

a bleed cap having means for engaging said stem, said cap having a central longitudinal plunger for extending into said bore of said stem, said plunger having a first longitudinal section, an annular contact tip section adjacent the inner end of said longitudinal section for mating with said annular mating sealing surface of said transition section and an extension extending from said annular contact tip section for placement with said narrow section of said bore, said cap when tightly secured to said stem causes said annular contact tip section to matingly seal with said transition section of said bore and when said cap is loosened causes said contact annular tip to move away from said transition section to allow controlled escape of air trapped within said filtering chamber to atmosphere.

6. A plastic pressure filter assembly according to claim 5 wherein said cross sectional configuration of said inner end of said plunger substantially fills said narrow section of said bore when said cap is tightly engaged with respect to said stem.

7. A plastic pressure filter assembly according to claim 5 wherein said annular mating surface is disposed at an angle of about 30°.

8. A plastic pressure filter assembly according to claim 5 wherein said narrow section has a diameter of about 0.055 inches and said inner end of said plunger has a diameter of about 0.045 inches.

* * * * *